United States Patent Office 3,134,805
Patented May 26, 1964

3,134,805
PREPARATION OF TERTIARY-AMINOALKYL
AMINO-ALKOXYBENZOATES
Benjamin F. Tullar, East Greenbush, N.Y., assignor to Sterling Drug Inc., New York, N.Y., a corporation of Delaware
No Drawing. Filed Oct. 15, 1954, Ser. No. 462,620
7 Claims. (Cl. 260—472)

This invention relates to the preparation of tertiary-aminoalkyl amino-alkoxybenzoates. In particular, it relates to the preparation of such basic esters utilizing an amino-hydroxybenzoic acid as a starting material.

These tertiary-aminoalkyl amino-alkoxybenzoates have been found recently to be highly potent local anesthetic agents. Heretofore, these basic esters have been prepared using the corresponding nitro-hydroxybenzoic acid as the starting material and a series of steps ending with the reduction of the corresponding tertiary-aminoalkyl nitro-alkoxybenzoates. For example, Clinton and Laskowski, in U.S. Patent 2,689,248, issued September 14, 1954, describe this method for preparing tertiary-aminoalkyl 4-amino-2-alkoxybenzoates using 4-nitro-2-hydroxybenzoic acid (PNS) as their starting material. A preferred embodiment of my invention is the process for the preparation of these basic 4-amino-2-alkoxybenzoates using 4-amino-2-hydroxybenzoic acid (PAS) as the starting material. Since the starting material (PAS) of my preferred embodiment is appreciably less expensive than PNS, my invention provides an economic advantage over the heretofore used process.

My process is illustrated by the following series of reactions:

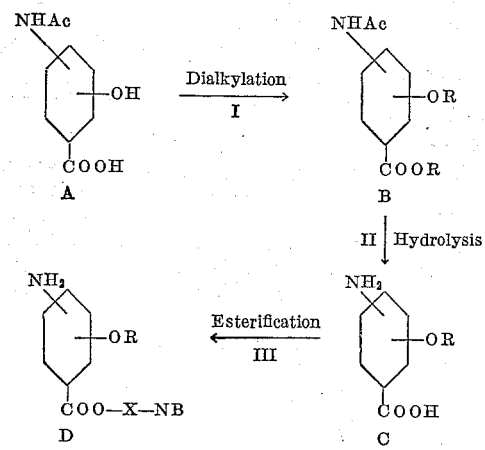

where Ac is a lower alkanoyl radical having from two to four carbon atoms inclusive, R is a lower alkyl radical having from one to six carbon atoms inclusive, X is a lower alkylene radical having from two to four carbon atoms and its two free valence bonds on different carbon atoms, and NB is a tertiary-amino radical comprehending dialkylamino radicals and saturated N-heteromonocyclic radicals having five to six ring atoms, illustrated by 1-piperidyl, alkylated-1-piperidyl, 1-pyrrolidyl, alkylated 1-pyrrolidyl, 4-morpholinyl, and the like. In the above formulas, the positions of the amino and alkoxy substituents in compounds C and D, or of acylamino and alkoxy in compound B, or of acylamino and hydroxy in compound A, can be in any combination, e.g., compound C can be a 4-amino-2-alkoxybenzoic acid, a 4-amino-3-alkoxybenzoic acid, a 3-amino-2-alkoxybenzoic acid, a 5-amino-2-alkoxybenzoic acid, a 3-amino-5-alkoxybenzoic acid, a 2-amino-4-alkoxybenzoic acid, a 2-amino-6-alkoxybenzoic acid, etc.

The (lower alkanoylamino)-hydroxybenzoic acid (A) was formed by reacting an amino-hydroxybenzoic acid with an alkanoylating agent, e.g., acetic anhydride is used where Ac is acetyl, preferably in the presence of acetic acid. In step I the (lower alkanoylamino)-hydroxybenzoic acid (A) is dialkylated to form an alkyl acylamino-alkoxybenzoate (B); in step II said benzoate (B) is hydrolyzed to form the corresponding amino-alkoxybenzoic acid (C); and in step III the acid (C) is esterified with a tertiary-aminoalkyl halide to form the tertiary-aminoalkyl amino-alkoxybenzoate (D). Illustrative of this process is the preparation of 2-diethylamino-ethyl 4-amino-3-n-butoxybenzoate, as follows: 4-acetylamino-3-hydroxybenzoic acid is dibutylated to yield n-butyl 4-acetyl-amino-3-n-butoxybenzoate, which in step II is hydrolyzed to yield 4-amino-3-n-butoxybenzoic acid, which is then esterified with 2-diethylaminoethyl chloride to yield 2-diethylaminoethyl 4-amino-3-n-butoxybenzoate.

A preferred embodiment of my invention is the preparation of tertiary-aminoalkyl 4-amino-2-alkoxybenzoates (D) using 4-amino-2-hydroxybenzoic acid (PAS) as the starting material to prepare the 4-acylamino-2-hydroxybenzoic acid (A). Step I is carried out by reacting the 4-acylamino-2-hydroxybenzoic acid with an alkyl ester of a strong acid, either organic or inorganic, e.g., n-propyl bromide, dimethyl sulfate, ethyl benzenesulfonate, n-pentyl para-toluenesulfonate, and the like. Step I was carried out preferably by heating an alkali metal salt of the 4-acylamino-2-hydroxybenzoic acid (A) with an alkylating agent in the presence of an alkali carbonate in a non-polar solvent. In practicing my invention, I found alkyl benzenesulfonates, such as ethyl benzenesulfonate, n-propyl benzenesulfonate, isobutyl benzenesulfonate, n-hexyl para-toluenesulfonate, and the like, very satisfactory as alkylating agents, especially for the 2-alkoxy compounds where the alkoxyl substituent has three or more carbon atoms. In the preparation of the 2-methoxy or 2-ethoxy compounds, dimethyl sulfate or diethyl sulfate are useful alkylating agents. The reaction temperature was preferably kept between 100° C. and 160° C.; higher temperatures, up to about 200° C., can be used, however, to no particular advantage, any may produce undesirable side reactions resulting in decreased yields; temperatures below 100° C. can be used, however, with an appreciable increase in the reaction time. Said non-polar solvents are water-immiscible or only moderately soluble in water, and preferably are those that form an azeotrope with water, so that the water can be removed as it is formed during the reaction. Although this water removal is not necessary, it does have the advantages of facilitating the reaction and enabling the operator to determine when the reaction is complete. In practice, I found methyl isobutyl ketone a highly satisfactory solvent. Other non-polar solvents that can be used are toluene, xylene, diethyl ketone, 2-heptanone, and the like.

The hydrolysis step II was preferably carried out by heating the alkyl 4-acylamino-2-alkoxybenzoate (B) in an aqueous alkali medium, the heating being in the range of about 50–150° C.

The esterification step III was accomplished by heating the 4-amino-2-alkoxybenzoic acid (C) as its alkali metal salt with a tertiary-aminoalkyl halide, halogen-X-NB, in a non-polar solvent. This was conveniently done by first heating the acid with an alkali carbonate in the non-polar solvent to form its alkali metal salt, removing the water of reaction as it is formed, and then heating the alkali metal salt with the tertiary-aminoalkyl halide. The reaction temperatures and non-polar solvents used in step III are the same as those described above as suitable for step I.

My process is further illustrated by the following embodiments without, however, limiting it thereto.

EXAMPLES

1. (Lower Alkanoylamino)-Hydroxybenzoic Acids (A)

The acylation of an amino-hydroxybenzoic acid to form the intermediate (lower alkanoylamino)-hydroxybenzoic acids (A) is illustrated by the following preparation of 4-acetylamino-2-hydroxybenzoic acid (4-ethanoylamino-2-hydroxybenzoic acid): 153 g. of 4-amino-2-hydroxybenzoic acid was dissolved in 2 liters of acetic acid by warming to 80° C. This solution was cooled to 20° C. and treated with 250 g. of acetic anhydride, whereupon the temperature rose to about 35° C. and crystallization of the product started. The mixture was warmed to about 50–60° C. for one hour to complete the acetylation, then cooled to about 20° C., and the precipitate collected. The precipitate was washed with about 200 ml. of n-pentane and dried at 50–60° C., yielding about 180–190 g. of 4-acetylamino-2-hydroxybenzoic acid, M.P. 231–232° C. dec.

Other (lower alkanoylamino)-hydroxybenzoic acids that can be prepared according to the foregoing procedure, using the appropriate alkanoic acid, anhydride and amino-hydroxybenzoic acid, are: 4-n-propanoylamino-2-hydroxybenzoic acid, 4-n-butanoylamino-2-hydroxybenzoic acid, 4-acetylamino-3-hydroxybenzoic acid, 5-acetylamino-2-hydroxybenzoic acid, 3-acetylamino-2-hydroxybenzoic acid, 6-acetylamino-2-hydroxybenzoic acid, and the like.

2. Alkyl (Lower Alkanoylamino)-Alkoxybenzoates (B)

The dialkylation of the acylamino-hydoxybenzoic acids (A) is illustrated by the following preparation of n-propyl 4-acetylamino-2-n-propoxybenzoate: A mixture of 97.5 g. of 4-acetylamino-2-hydroxybenzoic acid, 180 g. of $K_2CO_3 \cdot 1\frac{1}{2}H_2O$ and 1400 cc. of methyl isobutyl ketone was refluxed with stirring under a water-trap about four hours until no more water separated (about 35 cc. of water was collected). A total of 242 g. of n-propyl benzenesulfonate was added at a substantially uniform rate over a period of about thirty minutes at reflux (115° C.) with good stirring. Refluxing and stirring were continued for about twenty-four hours. The hot solution (about 100° C.) was filtered and the cake was washed with two 200 cc. portions of hot methyl isobutyl ketone. The combined filtrates were concentrated in vacuo to about 400 cc. and cooled to 5° C. The crystalline product that precipitated was separated. Re-concentration of the mother liquor and recrystallization from benzene or ethyl acetate gave a small second crop of crystals. The total yield of n-propyl 4-acetylamino-2-n-propoxybenzoate was about 107 g., M.P. 100–105° C. When recrystallized from ethyl acetate, the ester melted at 105–107° C.

*Analysis.*—Calcd. for $C_{15}H_{21}NO_4$: N, 5.02%. Found: N, 4.97%.

Following the foregoing procedure, but using 97.5 g. of 4-acetylamino-2-hydroxybenzoic acid, 153 g. of $K_2CO_3$, 1460 cc. of methyl isobutyl ketone and 250 g. of n-butyl benzenesulfonate, there was obtained about 159 g. of n-butyl 4-acetylamino-2-n-butoxybenzoate, M.P. 55–58° C. Upon recrystallization from acetone, this ester melted at 58–60° C.

*Analysis.*—Calcd. for $C_{17}H_{25}NO_4$: N, 4.56%. Found: N, 4.65%.

Other alkyl acylamino-alkoxybenzoates that can be prepared following the procedure given above, using the appropriate alkyl benzenesulfonate and acylamino-hydroxybenzoic acid, are: isobutyl 4-acetylamino-2-isobutoxybenzoate, n-pentyl 4-acetylamino-2-n-pentoxybenzoate, n-hexyl 4-acetylamino-2-n-hexoxybenzoate, n-propyl 4-n-butanoylamino-2-n-propoxybenzoate, n-butyl 4-acetylamino-3-n-butoxybenzoate, n-propyl 5-acetylamino-2-n-propoxybenzoate, n-butyl 3-acetylamino-2-n-butoxybenzoate, ethyl 6-acetylamino-2-ethoxybenzoate, and the like.

Another illustration of the dialkylation of the intermediate acylamino-hydroxybenzoic acids (A) is the following preparation of ethyl 4-acetylamino-2-ethoxybenzoate using diethyl sulfate as the alkylating agent: A mixture of 19.5 g. of 4-acetylamino-2-hydroxybenzoic acid, 400 cc. of xylene and 27.6 g. of powdered $K_2CO_3$ (anhydrous) was refluxed under a water-trap until no more water separated. To the reaction mixture there was added dropwise 30.8 g. of diethyl sulfate and refluxing was continued overnight. The hot solution was filtered to remove the salts and the filtrate cooled to yield the crystalline product, ethyl 4-acetylamino-2-ethoxybenzoate, which was collected and dried, M.P. 138–140° C. dec. Upon recrystallization from ethyl acetate, this ester melted at 140–142° C.

*Analysis.*—Calcd. for $C_{13}H_{17}NO_4$: N, 5.58%. Found: N, 5.42%.

3. Amino-Alkoxybenzoic Acids (C)

The hydrolysis of the alkyl acylamino-alkoxybenzoates (B) to form the corresponding amino-alkoxybenzoic acids (C) is illustrated by the following preparation of 4-amino-2-n-propoxybenzoic acid: 107 g. of n-propyl 4-acetylamino-2-n-propoxybenzoate was stirred two hours at 95° C. with 500 cc. of water and 95 cc. of 35% aqueous sodium hydroxide solution. At the end of this heating period, the solution was cooled to 20° C. and acidified to pH with concentrated hydrochloric acid. The precipitate was collected, washed with cool water, slurried with a little ethyl acetate, which removed most of the color, and again filtered, yielding 60 g. of 4-amino-2-n-propoxybenzoic acid. Upon recrystallization from 70% aqueous ethanol, this acid melted at 182.5–183.2° C.

*Analysis.*—Calcd. for $C_{10}H_{13}NO_3$: N, 7.11%. Found: N, 7.16%.

Following the above procedure for the hydrolysis of n-propyl 4-acetylamino-2-n-propoxybenzoate, using 298 g. of n-butyl 4-acetylamino-2-n-butoxybenzoate, 1500 cc. of water and 260 cc. of 35% aqueous sodium hydroxide solution, there was obtained about 130 g. of 4-amino-2-n-butoxybenzoic acid, M.P. 167–168.2° C. with decomposition, after recrystallization from isopropanol.

*Analysis.*—Calcd. for $C_{11}H_{15}NO_3$: N, 6.69%. Found: N, 6.41%.

Other amino-alkoxybenzoic acids that can be prepared according to the foregoing procedure are: 4-amino-2-methoxybenzoic acid, 4-amino-2-ethoxybenzoic acid, 4-amino-2-isobutoxybenzoic acid, 4-amino-2-n-pentoxybenzoic acid, 4-amino-2-n-hexoxybenzoic acid, 4-amino-3-n-butoxybenzoic acid, 5-amino-2-n-propoxybenzoic acid, 3-amino-2-n-butoxybenzoic acid, 6-amino-2-ethoxybenzoic acid, and the like.

4. Tertiary-Aminoalkyl Amino-Alkoxybenzoates (D)

The esterification of the above-described amino-alkoxy-benzoic acids (C) with a tertiary-aminoalkyl halide to form the tertiary-aminoalkyl amino-alkoxybenzoates (D) is illustrated by the following preparation of 2-diethylaminoethyl 4-amino-2-n-propoxybenzoate: A mixture of 49 g. of 4-amino-2-n-propoxybenzoic acid, 800 cc. of methyl isobutyl ketone and 50 g. of $K_2CO_3 \cdot 1\frac{1}{2}H_2O$ was refluxed under a water-trap until no more water separated (about four hours for 8 cc. of water), and then 30 g. of 2-diethylaminoethyl chloride was added rapidly while refluxing. After an additional thirty minutes of refluxing, the mixture was filtered while hot and the filter cake was washed with two 100 cc. portions of hot methyl isobutyl ketone. The combined filtrates were evaporated to dryness in vacuo yielding, as an oily product, 2-diethylaminoethyl 4-amino-2-n-propoxybenzoate. This basic ester was converted into its hydrochloride salt by dissolving it in 500 cc. of isopropanol and treating the solution with one equivalent of concentrated hydrochloric acid. The resulting acidic solution was cooled, yielding about 56 g. of the crystalline 2-diethylaminoethyl 4-amino-2-n-propoxybenzoate as its monohydrochloride salt, M.P. 148° C.

Following the above procedure using 134 g. of 4-amino-2-n-butoxybenzoic acid, 2 liters of methyl isobutyl ketone, 92.4 g. of powdered $K_2CO_3$ (anhydrous) and 89.5 g. of 2-diethylaminoethyl chloride, there was obtained about 131 g. of 2-diethylaminoethyl 4-amino-2-n-butoxybenzoate, which, as its monohydrochloride salt, melted at 124–126° C.

Other tertiary-aminoalkyl amino-alkoxybenzoates that can be prepared following the above procedure, using the appropriate amino-alkoxybenzoic acid and tertiary-aminoalkyl halide, are: 2-dimethylaminoethyl 4-amino-2-methoxybenzoate, 4-dimethylaminobutyl 4-amino-2-n-butoxybenzoate, 2-diethylaminoethyl 4-amino-2-isobutoxybenzoate, 2-diethylaminoethyl 4-amino-2-n-pentoxybenzoate, 2-diethylaminoethyl 4-amino-2-n-hexoxybenzoate, 3-(1-piperidyl)propyl 4-amino-2-n-propoxybenzoate, 3-(1-pyrrolidyl)propyl 4-amino-2-n-propoxybenzoate, 2-(2,5-dimethyl-1-pyrrolidyl)ethyl 4-amino-2-n-hexoxybenzoate, 2-(di-n-butylamino)ethyl 4-amino-2-(2-propoxy)-benzoate, 2-(2-methyl-1-piperidyl)ethyl 4-amino-2-ethoxybenzoate, 2-diethylaminoethyl 4-amino-3-n-butoxybenzoate, 2-diethylaminoethyl 5-amino-2-n-propoxybenzoate, 2-diethylaminoethyl 3-amino-2-n-butoxybenzoate, 2-diethylaminoethyl 6-amino-2-ethoxybenzoate, 2-(4-morpholinyl)ethyl 4-amino-2-n-hexoxybenzoate, and the like.

I claim:

1. The process of preparing a tertiary-aminoalkyl amino-alkoxybenzoate where the alkoxy substituent has from one to six carbon atoms inclusive, which comprises the steps of dialkylating a (lower alkanoylamino)-hydroxybenzoic acid to form an alkyl (lower alkanoylamino)-alkoxybenzoate, hydrolyzing said benzoate to form the corresponding amino-alkoxybenzoic acid and esterifying said acid with a tertiary-aminoalkyl halide.

2. The process of preparing a dialkylaminoalkyl amino-alkoxybenzoate where the alkoxy substituent has from one to six carbon atoms inclusive, which comprises the steps of heating an alkali metal salt of a (lower alkanoylamino)-hydroxybenzoic acid with a lower alkyl ester of a strong acid in the presence of an alkali carbonate in a non-polar solvent, hydrolyzing the resulting alkyl (lower alkanoylamino)-alkoxybenzoate in an aqueous alkali medium and heating the resulting amino-alkoxybenzoic acid as its alkali metal salt with a dialkylaminoalkyl halide in a non-polar solvent.

3. The process of preparing a 2-diethylaminoethyl 4-amino-2-alkoxybenzoate where the 2-alkoxy substituent has from one to six carbon atoms inclusive, which comprises the steps of heating an alkali metal salt of a 4-(lower alkanoylamino)-2-hydroxybenzoic acid with an alkyl ester of a strong acid in the presence of an alkali carbonate in a non-polar solvent, hydrolyzing the resulting alkyl 4-(lower alkanoylamino)-2-alkoxybenzoate in an aqueous alkali medium and heating the resulting 4-amino-2-alkoxybenzoic acid as its alkali metal salt with a 2-diethylaminoethyl halide in a non-polar solvent.

4. The process of preparing 2-diethylaminoethyl 4-amino-2-n-propoxybenzoate, which comprises the steps of heating an alkali metal salt of 4-acetylamino-2-hydroxybenzoic acid with n-propyl benzenesulfonate in the presence of an alkali carbonate in a non-polar solvent, hydrolyzing the resulting n-propyl 4-acetylamino-2-n-propoxybenzoate in an aqueous alkali medium and heating the resulting 4-amino-2-n-propoxybenzoic acid as its alkali metal salt with 2-diethylaminoethyl chloride in a non-polar solvent.

5. The process of preparing 2-diethylaminoethyl 4-amino-2-n-butoxybenzoate, which comprises the steps of heating an alkali metal salt of 4-acetylamino-2-hydroxybenzoic acid with n-butyl benzenesulfonate in the presence of an alkali carbonate in a non-polar solvent, hydrolyzing the resulting n-butyl 4-acetylamino-2-n-butoxybenzoate in an aqueous alkali medium and heating the resulting 4-amino-2-n-butoxybenzoic acid as its alkali metal salt with 2-diethylaminoethyl chloride in a non-polar solvent.

6. In the process of preparing a dialkylaminoalkyl amino-alkoxybenzoate where the alkoxy substituent has from one to six carbon atoms inclusive, the step which comprises hydrolyzing a lower alkyl (lower alkanoylamino)-alkoxybenzoate in an aqueous alkali medium to form the corresponding amino-alkoxybenzoic acid.

7. In the process of preparing a 2-diethylaminoethyl 4-amino-2-alkoxybenzoate where the 2-alkoxy substituent has from one to six carbon atoms inclusive, the step which comprises hydrolyzing a lower alkyl 4-(lower alkanoylamino)-2-alkoxybenzoate in an aqueous alkali medium to form the corresponding 4-amino-2-alkoxybenzoic acid.

References Cited in the file of this patent

UNITED STATES PATENTS

| | | |
|---|---|---|
| 907,017 | Einhorn | Dec. 15, 1908 |
| 1,317,250 | Wildman | Sept. 30, 1919 |
| 2,657,210 | Clinton | Oct. 27, 1953 |
| 2,689,248 | Clinton et al. | Sept. 14, 1954 |

FOREIGN PATENTS

| | | |
|---|---|---|
| 189,838 | Germany | Oct. 22, 1907 |
| 498,859 | Belgium | Nov. 14, 1950 |
| 516,663 | Belgium | Jan. 15, 1953 |
| 517,764 | Belgium | Mar. 14, 1953 |
| 214,065 | Australia | Sept. 20, 1956 |

(Corresponding to U.S. Patent 2,828,328, March 25, 1958)

| | | |
|---|---|---|
| 770,361 | Great Britain | Mar. 20, 1957 |

UNITED STATES PATENT OFFICE
CERTIFICATE OF CORRECTION

Patent No. 3,134,805                 May 26, 1964

Benjamin F. Tullar

It is hereby certified that error appears in the above numbered patent requiring correction and that the said Letters Patent should read as corrected below.

Column 2, line 42, for "any" read -- and --; column 4, line 27, for "pH with" read -- pH 6 with --.

Signed and sealed this 13th day of October 1964.

(SEAL)
Attest:

ERNEST W. SWIDER
Attesting Officer

EDWARD J. BRENNER
Commissioner of Patents